United States Patent [19]

Maier

[11] 3,932,093
[45] Jan. 13, 1976

[54] TUBE EXPANDER APPARATUS

[76] Inventor: Johann H. Maier, 18584 NE. Second Ave., Miami, Fla. 33162

[22] Filed: Apr. 25, 1975

[21] Appl. No.: 571,640

[52] U.S. Cl. ............. 425/392; 425/403; 249/180; 249/184
[51] Int. Cl.² ............... B29C 17/00; B29D 23/00
[58] Field of Search ............... 425/392, 393, 403; 249/178, 179, 180, 184

[56] References Cited
UNITED STATES PATENTS

| | | | |
|---|---|---|---|
| 1,747,679 | 2/1930 | Perry | 249/180 X |
| 1,947,625 | 2/1934 | Smith | 249/180 X |
| 3,049,752 | 8/1962 | Jorda et al. | 425/392 X |
| 3,077,646 | 2/1963 | Tigerschiold | 249/180 X |
| 3,142,868 | 8/1964 | Blount | 425/392 X |

*Primary Examiner*—J. Howard Flint, Jr.
*Attorney, Agent, or Firm*—Oltman and Flynn

[57] ABSTRACT

A tube expander apparatus having an axially displaceable central shaft, a plurality of convex expander shoes in succession circumferentially around the shaft, and pivoted linkage arms between the shaft and the expander shoes and including:

a. first linkage arms pivoted to the expander shoes and to a fixed support collar which slidably passes the shaft;

b. and second and third linkage arms which are pivoted to the expander shoes above and below the latters' axial midpoint and to collars fixed to the shaft.

10 Claims, 10 Drawing Figures

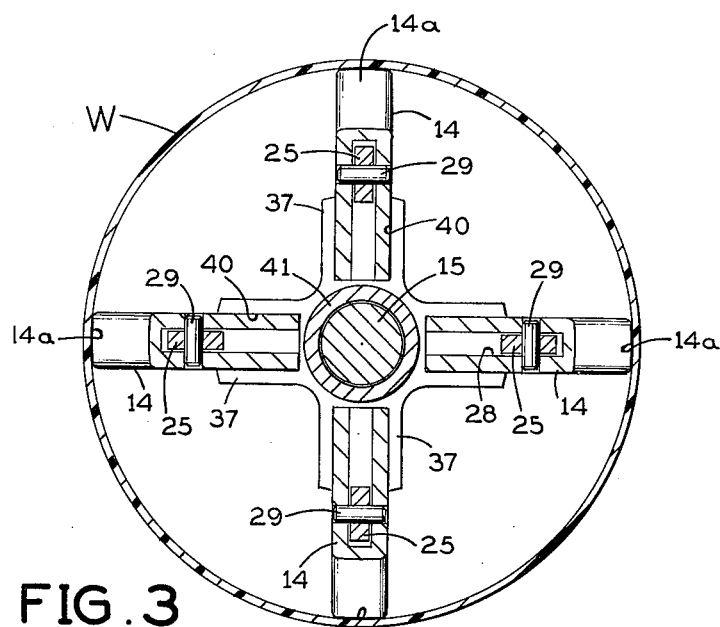
FIG. 3
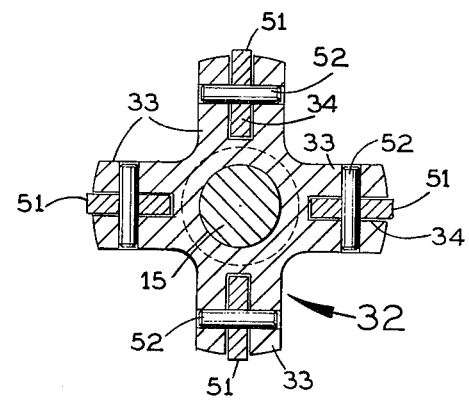
FIG. 4
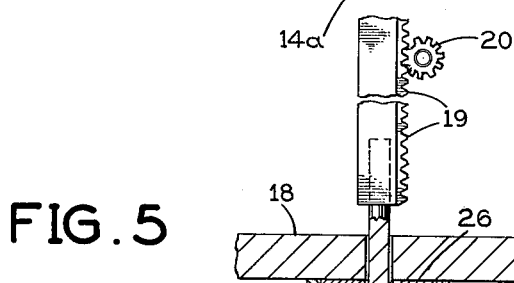
FIG. 5
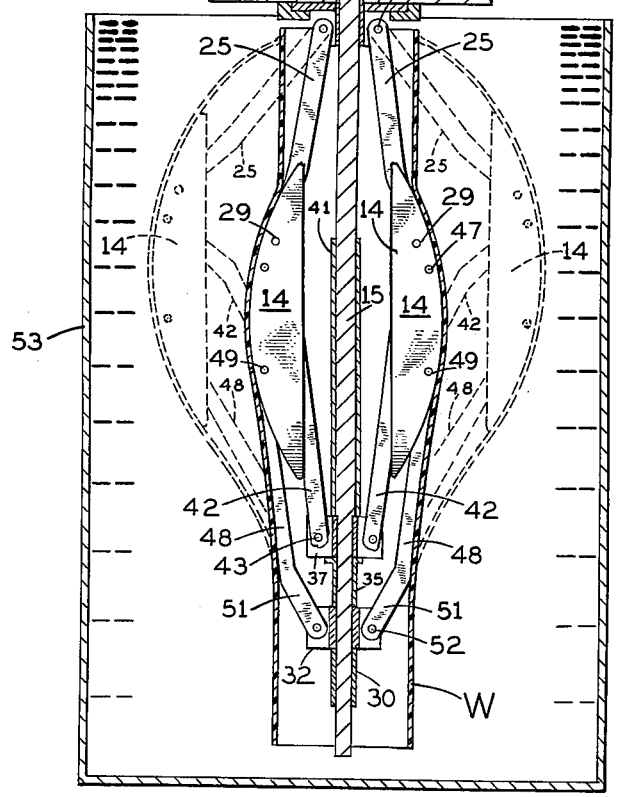
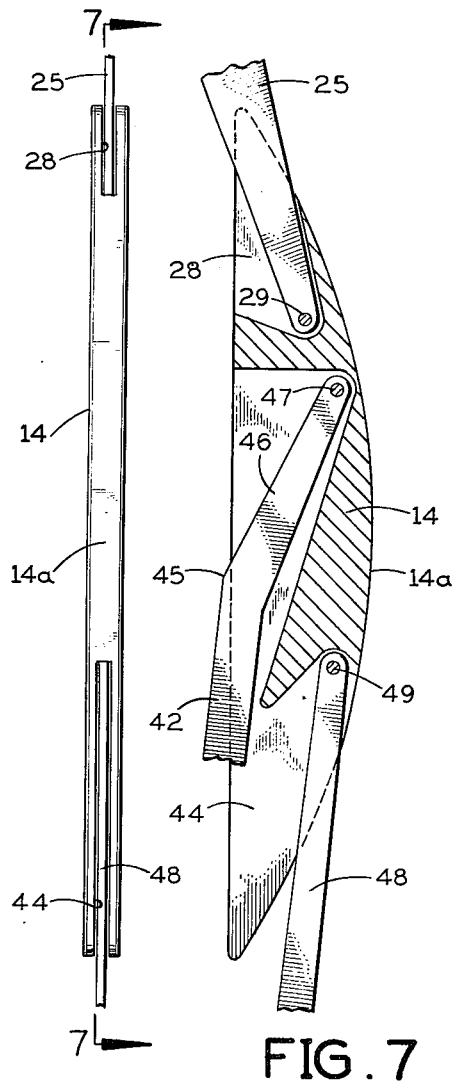
FIG. 6  FIG. 7

3,932,093

TUBE EXPANDER APPARATUS

BACKGROUND OF THE INVENTION

Various mechanisms have been proposed heretofore for radially expanding an annular workpiece. Examples of such prior proposals are disclosed in the following U.S. Pat. Nos. 72,904, Rees; 629,444, Hem; 752,153, Grotnes; 980,399, Bauroth; 1,039,885, Bauroth; 1,058,669, Goddard; 1,982,400, Reim; 2,089,476, Grotnes; 1,779,377, Swern; 2,413,103, Forbes; 2,931,416, Krise; 3,109,477, Avera; 1,067,115, Hufford; and 1,285,982, Goodard.

SUMMARY OF THE INVENTION

The present invention is directed to a novel apparatus for radially expanding the tubular workpiece of thermoplastic material so as to form outwardly projecting hollow ribs or flutes in the workpiece at successive circumferential locations.

In the present apparatus, an axially displaceable central shaft operates a plurality of laterally displaceable expander shoes through sets of pivoted linkage arms. In accordance with the preferred embodiment, the linkage arms of a first set have their outer ends pivotally connected to the expander shoes near one end and their inner ends pivotally connected to a fixed support collar which slidably passes the central shaft. Second and third sets of linkage arms have their outer ends pivotally connected to the expander shoes on opposite sides of the axial midpoint of the latter and have their inner ends pivotally connected to collars attached to the central shaft. Preferably, each expander shoe is narrow circumferentially and is convex longitudinally at its outer face.

The principal object of this invention is to provide a novel and improved apparatus for expanding a tubular workpiece, particularly a thermoplastic workpiece which is rigid before being heated and expanded.

Another object of this invention is to provide such an apparatus which is more reliable and durable in its operation because of the improved stability of its mechanism for imparting outward thrusts to the workpiece at different circumferential locations on the latter.

Further objects and advantages of this invention will be aaparent from the following detailed description of a presently preferred embodiment thereof, which is shown in the accompanying drawings, in which:

FIG. 3 is a horizontal cross-section taken along the line 3—3 in FIG. 1;

FIG. 4 is a horizontal cross-section taken along the line 4—4 in FIG. 1;

FIG. 5 is a longitudinal vertical section showing the present expander apparatus partly expanded (full lines) and further expanded (phantom lines);

FIG. 6 is an elevational view of one of the expander shoes in the present apparatus, viewed from its radially outward side of the apparatus;

FIG. 7 is a longitudinal section taken along the line 7—7 in FIG. 6;

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

Figure 10:
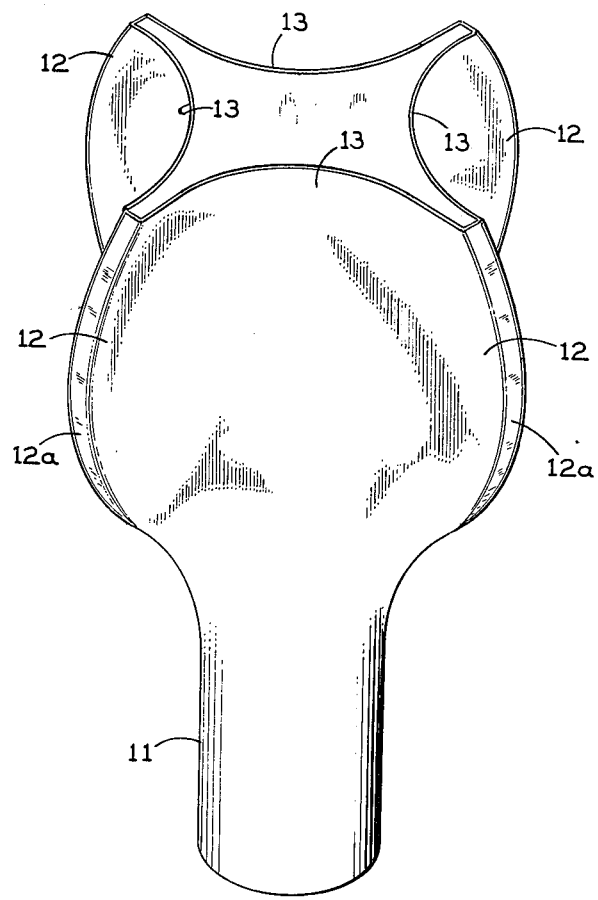
FIG. 10 is a perspective view of this article.

The present apparatus is constructed and arranged to produce from a cylindrical rigid tube of thermoplastic material, such as polyvinyl chloride, a hollow fluted or ribbed article as shown in FIG. 10, having a cylindrical stem 11 and a plurality of circumferentially spaced hollow ribs or flutes 12 projecting radially outward from the upper end of this stem. Each of these ribs presents a rounded outer end face 12a which is convex longitudinally. Neighboring ribs are joined to each other by rounded concave walls 13.

Figure 1:
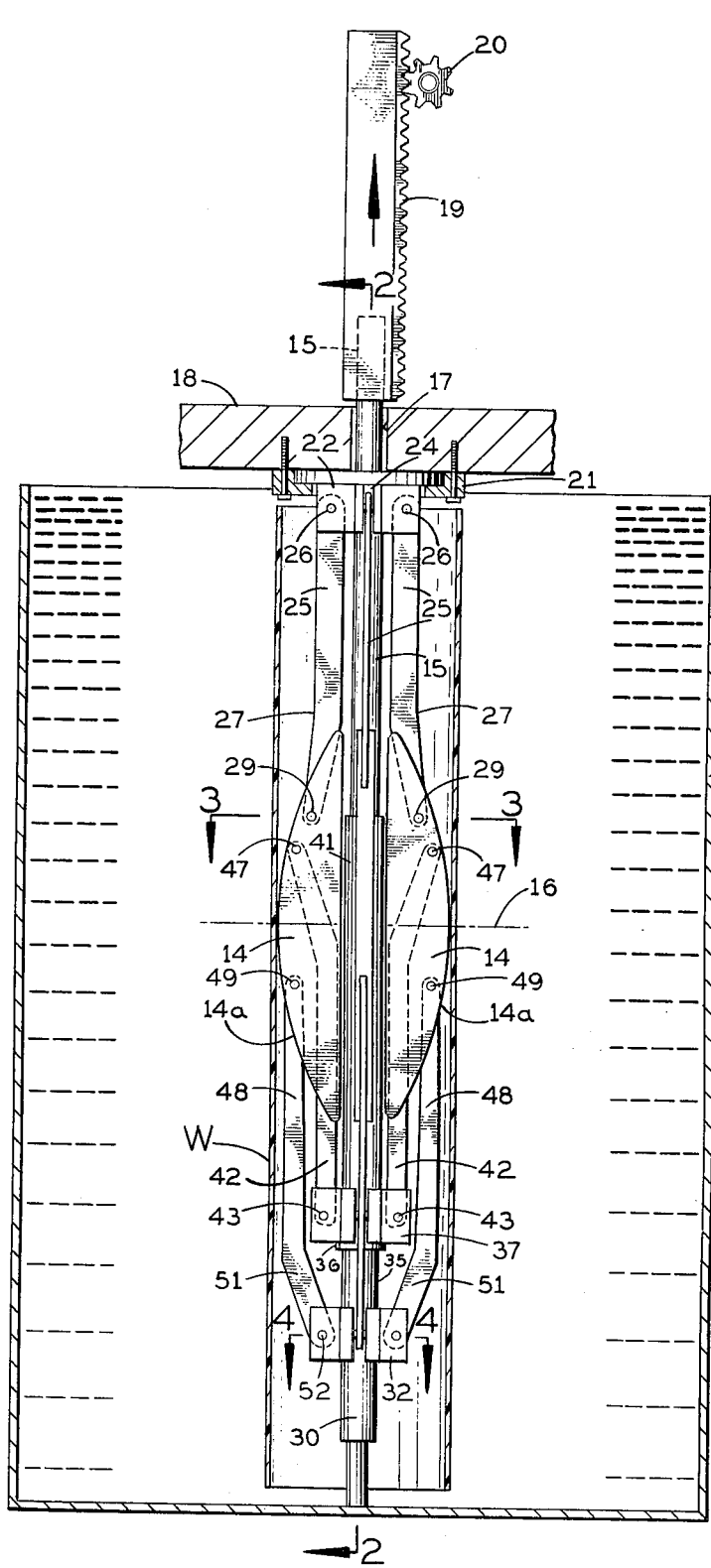
FIG. 1 is a longitudinal vertical section through a tube to be expanded by the present apparatus, which is shown in elevation in its fully retracted position inside the tube.

Referring to FIG. 1, this article is produced from the original cylindrical workpiece W by an expander apparatus having a plurality of rigid expander shoes 14 spaced apart circumferentially about a central shaft 15 at the same location along the latter. In the embodiment illustrated, there are four such expander shoes, but it will be understood that the number may vary from two to 24, depending upon the number of hollow flutes or ribs to be formed in the finished article.

As shown in FIG. 3, each expander shoe 14 is relatively narrow circumferentially and, as shown in FIG. 1, it presents a rounded outer face 14a which is convex axially of the shaft 15 (FIGS. 2 and 7) and is substantially symmetrical with respect to a centerline 16 passing through the longitudinal or axial midpoint of the shoe. Consequently, the outermost point of each expander shoe is located at this centerline.

The central shaft 15 passes up through an opening 17 in an overlying, fixed, horizontal support wall 18 (FIG. 1). Above this wall, the shaft is connected to a rack 19 driven by a pinion gear 20, so that by rotating this gear the shaft may be displaced axially.

Figure 2:
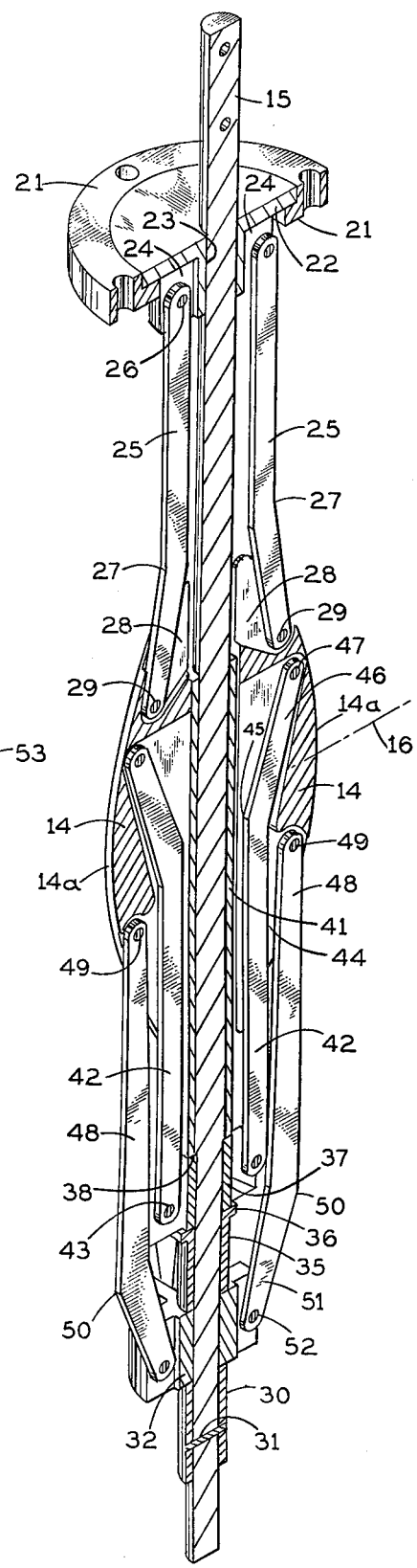
FIG. 2 is a longitudinal section through this expander apparatus, taken along the centerline 2—2 in FIG. 1.

A flanged annular retainer plate 21 is bolted to the underside of the support wall 18 around the opening 17 in the latter. A flanged support collar 22 is held by this retainer plate against the underside of the support wall 18 so as to be fixedly carried by the latter. As shown in FIG. 2, this collar has a central axial opening 23 through which the shaft 15 passes slidably. The collar also is formed with four circumferentially spaced, radial slots 24 (two of which appear in FIG. 2), which are open at the outer periphery of this collar. These slots are aligned, circumferentially of the assembly, with the respective four expander shoes 14.

A first set of four rigid linkage arms 25 have their upper ends received individually in the slots 24 the support collar 22, and there they are pivotally connected to this collar by respective horizontal pivot pins 26. These first linkage arms are straight for most of their length downward from the fixed support collar 22 and near their lower ends they are bent outward at 27, at a location spaced slightly above the upper ends of the expander shoes 14. The long, straight upper segment of each first linkage arm 25 extends substantially vertical when the expander is in its fully retracted position as shown in FIGS. 1 and 2. The outwardly bent lower ends of the linkage arms 25 extend down into narrow radial recesses 28 (FIG. 2) formed in the upper ends of the expander shoes 14, and there they are pivotally connected to the expander shoes by respective horizontal pivot pins 29.

Toward its lower end, the axially displaceable central shaft 15 in the present expander apparatus carries a bottom cylindrical sleeve or bushing 30, which is fastened to it by a cross pin 31 (FIG. 2). A lower collar 32 rests on the upper end of bushing 30 and provides an attachment means for additional linkage arms in the apparatus, as explained hereinafter. As shown in FIG. 4, this lower collar fits snugly on shaft 15, and it is cross-shaped, presenting four outwardly projecting, bifurcated radial arms 33, each having a radial slot 34 that is open at its outer end.

Referring to FIG. 2, a generally cylindrical bushing or sleeve 35 extends directly above the lower collar 32 and at its upper end presents an external annular flange 36. Sleeve 35 fits snugly on shaft 15.

An upper collar 37, similar to the lower collar 32, rests on top of this flange 36 and has its upper end abutting against a downwardly facing, transverse, annular shoulder 38 on the central shaft 15. This upper collar fits snugly on shaft 15, and it is cross-shaped, as shown in FIG. 3, presenting four outwardly projecting, bifurcated, radial arms 39, each having a radial slot 40 that is open at its outer end.

It will be evident that the shoulder 38 on the central shaft 15 and the cross pin 31 hold the assembly of the lower collar 32, intermediate sleeve 35 and upper collar 37 tightly on the shaft 15, such that these elements move axially in unison with the shaft when it is displaced.

Figure 8:
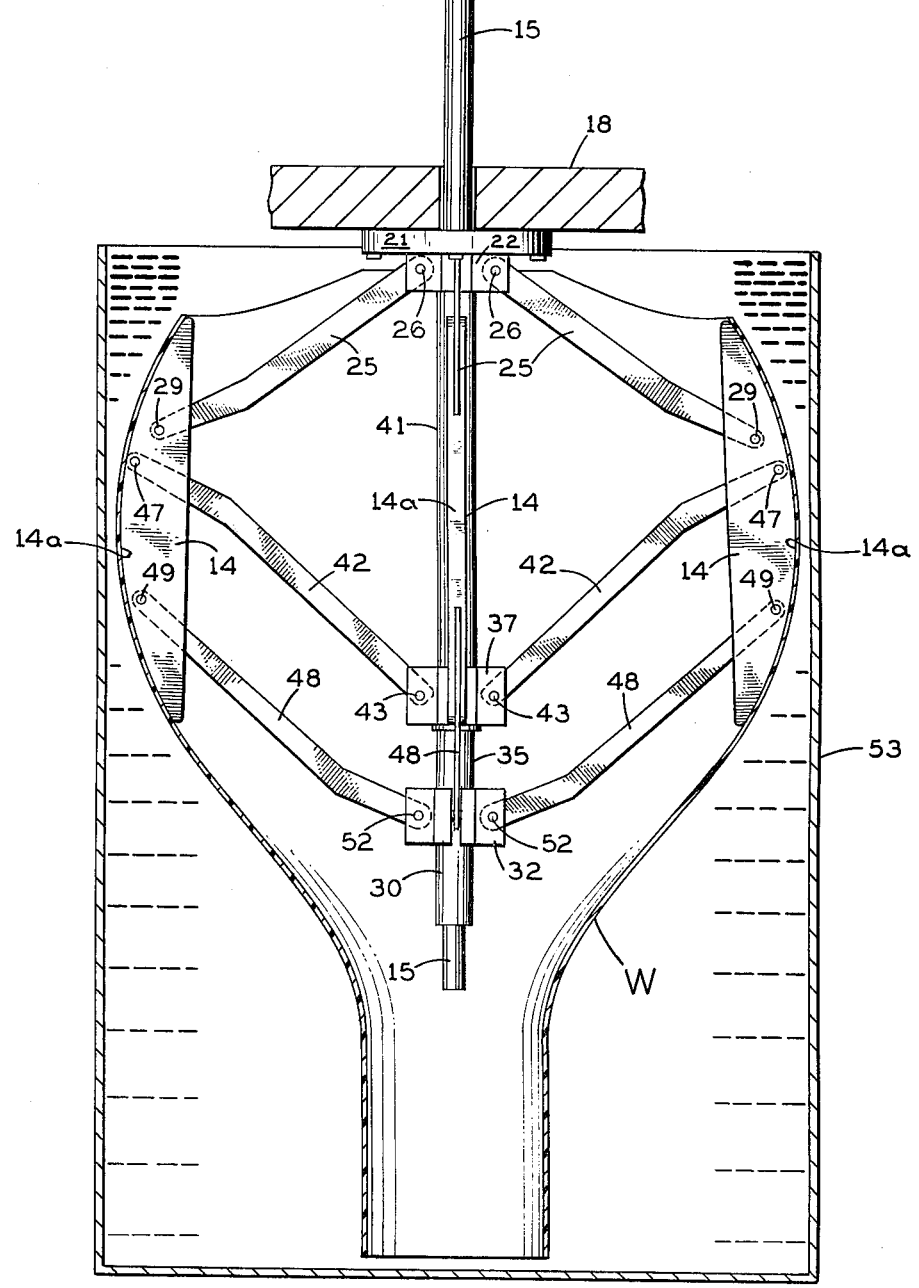
FIG. 8 is a longitudinal vertical section showing the present expander apparatus fully expanded.
Figure 9:
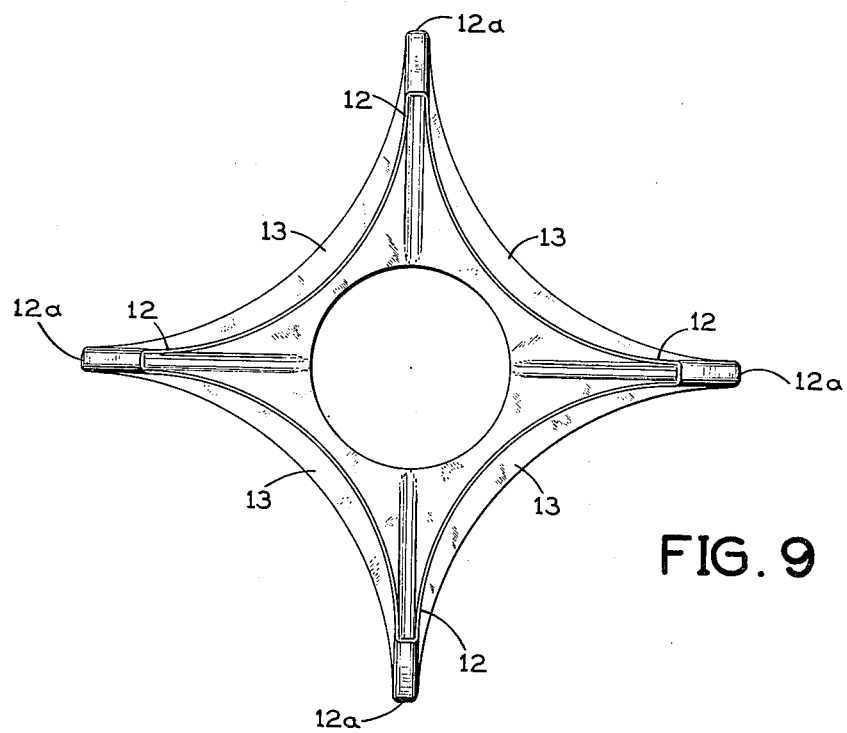
FIG. 9 is a top plan view of a hollow article produced from a plastic tube by the present expander.

An elongated cylindrical sleeve 41 fits snugly around shaft 15 above the collar 37 and at the inside of the expander shoes 14. The upper end of this sleeve is engageable with the lower end of the support collar 32 for the first linkage arms 25 (FIG. 8) to limit the upward axial displacement of shaft 15 and thereby limit the outward movement of the expander shoes 14.

A second set of four rigid linkage arms 42 have their lower ends received in the slots 40 in the upper collar 37, and there they are pivotally connected to this collar by horizontal pivot pins 43. In the fully retracted position of the expander apparatus (FIG. 2), these second linkage arms extend straight up from collar 37 and into recesses 44 in the respective expander shoes 14 which are open at the lower ends of the latter. Just slightly below the centerline 16 of the expander shoe, each second linkage arm is bent outward at 45 and presents a short outwardly inclined upper end segment 46 whose upper end is pivoted to the expander shoe by a horizontal cross pin 47.

A third set of four rigid linkage arms 48 have their upper ends received in the slots 44 in the respective expander shoes and pivotally connected to the latter by horizontal pivot pins 49. The pivot pins 49 for the upper ends of the third linkage arms 48 are vertically aligned with the pivot pins 47 for the upper ends of the second linkage arms 42. The pivot pins 49 are spaced below the centerline 16 of the expander shoes by the same amount that the pivot pins 47 are spaced above it. In the fully retracted position of the expander apparatus, the third linkage arms 48 extend substantially straight down from their pivoted upper ends, closely spaced outside the second linkage arms 42 and substantially parallel to the latter. Just slightly below the collar 37 for the second linkage arms 42, each third linkage arm 48 is bent inward at 50 and below this bend it presents an inwardly inclined short, lower end segment 51 which extends down into the corresponding radial slot 34 in the lower collar 32. Here it is pivotally connected to the lower collar by a horizontal pivot pin 52.

The pivots 52 for the lower ends of the third linkage 48 are spaced vertically below the pivots 43 for the lower ends of the second linkage arms 42 by the same amount as the spacing between the respective pivots 49 and 47 at the upper ends of these linkage arms. With this arrangement, a parallelogram linkage is provided between the collars 32 and 37 on shaft 15 and each expander shoe 14.

In the operation of this apparatus, when the shaft 15 is moved upward (e.g., from the full line position to the phantom line position in FIG. 5), the second and third linkage arms 42 and 48 push the respective expander shoes outward from the shaft 15 and upward by the same amount that the shaft is displaced upward. The first linkage arms 15 act between the fixed support collar 22 and the expander shoes to stabilize the expander shoes and apply the reaction force on the expander shoes to collar 22.

The foregoing expansion of the present apparatus may be carried out in an open-topped container 53 filled with hot water which heats and softens the thermoplastic tubular workpiece W. After the tube has been expanded, as shown, the expander apparatus may be removed from the water-filled container, and then the expander apparatus may be contracted for removal from the expanded workpiece.

The expander apparatus just disclosed has been found to give improved performance because of the stability of the linkage arms, particularly the second and third sets of linkage arms 42 and 47, which act between the central shaft 15 and the expander shoes 14 to force the expander shoes outward in response to axial displacement of the central shaft in one direction.

I claim:

1. In an apparatus for expanding a tubular workpiece, said apparatus having:

an axially displaceable central shaft;

a fixed support having an opening which slidably passes said shaft;

attachment means fixed to said shaft for movement in unison therewith toward and away from said fixed support;

a plurality of expander shoes in succession circumferentially around said shaft;

and linkage arms acting between said fixed support and said expander shoes and between said attachments means and said expander shoes for moving said shoes outward from the shaft upon axial movement of the shaft in one direction and for moving said shoes inward toward the shaft upon axial movement of the shaft in the opposite direction;

the improvement wherein said linkage arms comprise:

a plurality of circumferentially spaced, first, rigid linkage arms, each pivotally connected at its inner end to said fixed support and pivotally connected at its outer end to a corresponding expander shoe at an off-center location on the latter toward said fixed support;

a plurality of circumferentially spaced, second, rigid linkage arms, each pivotally connected at its outer end to a corresponding expander shoe at an off-center location on the latter toward said fixed support but farther from said fixed support than the pivotal connection of the corresponding first linkage arm to said shoe, and each pivotally connected at its inner end to said attachment means on the shaft;

and a plurality of circumferentially spaced, third, rigid linkage arms, each pivotally connected at its outer end to a corresponding expander shoe at an off-center location on the latter away from said fixed support, and each extending outside the corresponding second linkage arm and pivotally connected at its inner end to said attachment means at a location on the latter spaced from the pivotal connection thereto of the inner end of the corresponding second linkage arm in a direction away from said fixed support.

2. An expander apparatus according to claim 1, wherein the outer ends of the corresponding second and third linkage arms are spaced apart axially by the same amount as their inner ends.

3. An expander apparatus according to claim 2, wherein:

each second linkage arm has a long straight segment extending from its inner end and is bent transversely outward near its outer end;

and each third linkage arm has a long straight segment extending from its outer end and is bent transversely inward near its inner end.

4. An expander apparatus according to claim 3, wherein the pivots for the outer ends of the corresponding second and third linkage arms are substantially equidistantly spaced on opposite sides of the axial midpoint of the corresponding expander shoe.

5. An expander apparatus according to claim 1, wherein the pivots for the outer ends of the corresponding second and third linkage arms are spaced from the axial midpoint of the corresponding expander shoe substantially equidistantly on opposite sides of said midpoint.

6. An expander apparatus according to claim 1, wherein said attachment means comprise:

an upper collar on said shaft having a plurality of circumferentially spaced radial slots therein which are open at the outside of said collar and which receive the pivoted inner ends of said second linkage arms;

and a lower collar on said shaft below said upper collar and having a plurality of circumferentially spaced radial slots therein which are open at the outside of said lower collar and which receive the pivoted inner ends of said third linkage arms.

7. An expander apparatus according to claim 6, wherein the pivots for the outer ends of the corresponding second and third linkage arms are located substantially equidistantly on opposite sides of the axial midpoint of the corresponding expander shoe.

8. In an apparatus for expanding a tubular workpiece, said apparatus having:

an axially displaceably central shaft;

first and second collar means spaced apart along said shaft, said first collar means slidably passing said shaft, said second collar means being attached to said shaft to move axially in unison therewith;

a plurality of expander shoes in succession circumferentially around said shaft;

and linkage arms acting between said first and second collar means and said expander shoes for moving said shoes outward from the shaft upon axial movement of the shaft in one direction and for moving said shoes inward toward the shaft upon axial movement of the shaft in the opposite direction;

the improvement wherein said linkage arms comprise:

a plurality of circumferentially spaced, first, rigid linkage arms, each pivotally connected at its inner end to one of said collar means and pivotally connected at its outer end to a corresponding expander shoe at an off-center location on the latter toward said one collar means;

a plurality of circumferentially spaced, second, rigid linkage arms, each pivotally connected at its outer end to a corresponding expander shoe at an off-center location on the latter toward said one collar means but farther from said one collar means than the pivotal connection of the corresponding first linkage arm to said shoe, and each pivotally connected at its inner end to the other of said collar means;

and a plurality of circumferentially spaced, third, rigid linkage arms, each pivotally connected at its outer end to a corresponding expander shoe at an off-center location on the latter away from said one collar means, and each extending outside the corresponding second linkage arm and pivotally connected at its inner end to said other collar means at a location on the latter spaced from the pivotal connection thereto of the inner end of the corresponding second linkage arm in a direction away from said one collar means.

9. An expander apparatus according to claim 8, wherein each of said expander shoes is narrow circumferentially and elongated longitudinally of the shaft, and each expander shoe has an outside face which is convex longitudinally.

10. An expander apparatus according to claim 9, wherein the pivots for the outer ends of the corresponding second and third linkage arms are spaced from the longitudinal midpoint of the corresponding expander shoe substantially equidistantly on opposite sides of said midpoint.

* * * * *